US007137565B2

(12) United States Patent
Van Overbeke et al.

(10) Patent No.: US 7,137,565 B2
(45) Date of Patent: Nov. 21, 2006

(54) METHOD AND ALGORITHM FOR ACCESSING A SMART CARD STORED IN A TELECOMMUNICATIONS CARD FROM A HOST DEVICE TO WHICH SAID TELECOMMUNICATIONS IS CONNECTED

(75) Inventors: Geert Van Overbeke, Leuven (BE); Jan Heylen, Geel (BE); Jan Vercruysse, Blanden (BE)

(73) Assignee: Option, Leuven (BE)

( * ) Notice: Subject to any disclaimer, the term of this patent is extended or adjusted under 35 U.S.C. 154(b) by 0 days.

(21) Appl. No.: 10/961,399

(22) Filed: Oct. 12, 2004

(65) Prior Publication Data

US 2005/0109837 A1 May 26, 2005

(30) Foreign Application Priority Data

Oct. 10, 2003 (EP) ................................. 03447247

(51) Int. Cl.
*G06K 19/06* (2006.01)

(52) U.S. Cl. ...................................................... 235/492

(58) Field of Classification Search ................. 235/492
See application file for complete search history.

(56) References Cited

U.S. PATENT DOCUMENTS 5,684,742 A * 11/1997 Bublitz et al. .............. 235/492
5,942,738 A * 8/1999 Cesaire et al. .............. 235/380
6,036,100 A * 3/2000 Asami ........................ 235/492
6,082,615 A * 7/2000 Cesaire et al. .............. 235/379
6,279,047 B1 * 8/2001 Bublitz et al. ................ 710/11
6,470,071 B1 * 10/2002 Baertsch et al. .............. 378/62
6,769,620 B1 * 8/2004 Devaux et al. ............. 235/492
6,915,124 B1 * 7/2005 Kiessling et al. ........... 455/411
2001/0045453 A1 * 11/2001 Devaux et al. ............. 235/380
2002/0046185 A1 * 4/2002 Villart et al. ................. 705/64
2002/0065044 A1 * 5/2002 Ito ............................. 455/41
2002/0100798 A1 * 8/2002 Farrugia et al. ............ 235/380

FOREIGN PATENT DOCUMENTS

JP 01209588 A * 8/1989

* cited by examiner

*Primary Examiner*—Uyen-Chau N. Le
(74) *Attorney, Agent, or Firm*—Browdy and Neimark, PLLC

(57) ABSTRACT

A method for accessing a smart card (SIM) from a host device (TE) via a telecommunications card (MT), the telecommunications card (MT) comprising a command interpreter (TA) for interpreting host device commands and a modem (ME) with associated smart card reader, the modem (ME) being only accessible to the host device via the command interpreter (TA), the method comprising the steps of: (a) providing an access command (AT+CSIM) on the host device, instructing the command interpreter (TA) to pass on any attached command originating from the host device (TE) to the smart card reader; (b) attaching an application command (APDU) to the access command (AT+CSIM) and forwarding both to the command interpreter (TA); (c) performing the application command (APDU) on the smart card reader; (d) storing a response given by the smart card (SIM) in a first buffer which is accessible towards the host device (TE).

9 Claims, 2 Drawing Sheets

METHOD AND ALGORITHM FOR ACCESSING A SMART CARD STORED IN A TELECOMMUNICATIONS CARD FROM A HOST DEVICE TO WHICH SAID TELECOMMUNICATIONS IS CONNECTED

FIELD

The present invention relates to a method for accessing a smart card from a host device, such as for example a laptop or notebook PC, according to the preamble of claim 1.

The present invention further relates to a method for accessing a smart card from a host device, such as for example a laptop or notebook PC, according to the preamble of claim 7.

BACKGROUND

Today, smart card manufacturers make use of their own developed USB dongle containing a smart card reader. The PCSC-driver and the plug and play mechanism of Windows provide the OS with all information which enables any application running on the host device to utilise the smart card connected via the USB dongle for its own purpose.

On the other hand, telecommunications cards are known, which enable the host device to communicate via a telecommunication network. For enabling user identification towards the used telecommunication network, these telecommunication cards carry a smart card with user specific information and have a smart card reader on board. However, as it has been implemented up to now, this smart card can only be used for user identification purposes towards the network operator.

SUMMARY

It is an aim of this invention to provide a method and algorithm for accessing the smart card stored in the telecommunications card from the host device.

This aim is achieved by the method showing the steps of the characterising part of claim 1 and by an algorithm showing the steps of the characterising part of claim 7.

More particularly, an access command is provided on the host device, which is provided for instructing the command interpreter of the telecommunications card to pass on a command, which originates from the host device and is attached to the access command, directly to the smart card. For accessing the smart card from the host device, an application command is then attached to the access command and this combination is forwarded to the command interpreter, who is thus instructed to pass on the application command to the smart card. The response which is given by the smart card to the application command is stored in a buffer which is accessible towards the host device, so that the response can be read and used on the host device for further processing.

The use of the smart card reader on board the telecommunications card as generic smart card reader towards the host device has the advantage that the need for a separate smart card reader, such as a USB dongle, is avoided. As a result, the interface to which this separate smart card reader would be connected, such as a USB gate, remains free for connecting other devices. Furthermore, the user does no longer need to purchase separated devices for telecommunication and smart card access.

In a preferred embodiment of the method of the invention, the access command is included in a driver which is provided on the host device. This makes the access command available to any application running on the host device, so that any such application can gain access to the smart card stored in the telecommunications card by simply attaching its application command to the access command defined in the driver.

The accessibility to the smart card stored in the telecommunications card for applications running on the host device has the advantage that this smart card can be used for user authentication purposes on the host device instead of a smart card connected via a separate reader. This can not only avoid the need for the user to purchase two different smart cards for different applications, but also makes the one smart card available for the applications running on the host device while in use as user identification module towards the telecommunications network operator. As a result, the smart card can be used for authentication in internet sale, WLAN authentication, VPN security, banking wire transfers, user identification upon power-up of the host device, etc.

BRIEF DESCRIPTION OF THE DRAWINGS

The invention will be further elucidated by means of the following description and the appended figures.

DETAILED DESCRIPTION

Figure 1:
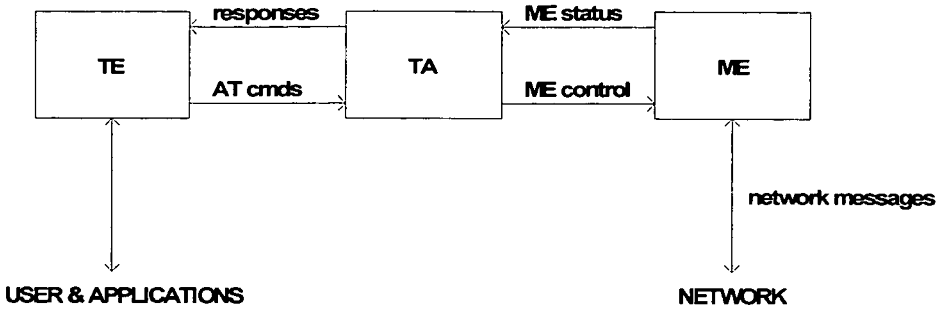
FIG. 1 schematically shows the interaction between the user, the host device, the telecommunications card and the telecommunications network with the method of the invention.

As shown in FIG. 1, the method of the invention enables access to a smart card SIM stored in a telecommunications card MT from a host device TE. The telecommunications card MT enables telecommunication between the host device TE and a telecommunications network which requires a smart card SIM for user identification, which may for instance include one or more of the following 3GPP Access Technologies: GSM/GPRS/UMTS or WLAN 802.11abg and 802.16. The telecommunications card MT comprises a command interpreter TA for interpreting host device commands and a modem ME with associated smart card reader for reading the smart card SIM. As used herein, the term smart card includes "SIM", "USIM" (3GPP UMTS SIM) and "UICC" (3GPP2 CDMA1x and CDMA2K) and any other smart card used for user identification purposes known to the person skilled in the art. The modem ME enables the telecommunication and the user identification, but is only accessible to the host device via the command interpreter TA.

In order to enable applications running on the host device TE to access the smart card SIM, an access command AT+CSIM is presented on the host device, for example in a PCSC driver for Windows XP. This access command—when executed—instructs the command interpreter TA to pass on any attached APDU (Application Protocol Data Unit) command originating from the host device TE to the smart card reader in the ME. Any response from the SIM to such an APDU is buffered in a first buffer which is accessible to the host device TE, so that the response can be read out to the host device in a next step. This first buffer is preferably provided on the TA, but may also be located on the ME or elsewhere on the MT.

With the method of the invention, any exchange of information with the SIM will be done by pure APDU commands with the AT+CSIM as the sole transporter, instead of applying AT-commands in order to have access to the SIM. For instance the functionality of the AT+CPIN (see below) may as well be sent by an APDU command. The huge advantage of employing APDU commands directly is that there is no need to translate them to AT commands, i.e. commands interpretable by the command interpreter TA.

When the method of the invention is implemented on a Windows system, the standard factory drivers will externally be visible as normal and there will be a driver that supports the Microsoft Interface for APDU. For the APDU commands "wrapped" in the AT+CSIM command to send, a MUX Command channel is allocated, which is not being used by the Command and Data ports. At installation of the telecommunications card, a Smartcard compatible device driver is exposed which is acceptable to Windows as a standard Smartcard Device. This Smartcard driver can use the Windows Smartcard library and environment to process Smartcard requests from XP and hence form user(TE) applications. Of course, the method and algorithm of the invention can also be implemented in other operating systems known to the person skilled in the art.

In the following, a number of measures will be described which contribute to the functioning of the access method of the invention and prevent harm to the telecommunication operations which may occur simultaneously.

A first measure is to store smart card type data (ATR_structure) in a second buffer, preferably on the modem ME, and to include a type request command AT_OATR in the PCSC driver on the host device TE. This enables the application which wants to access the SIM to first readout the smart card type data from the second buffer, assuring itself that the SIM is suitable. By buffering this information, the readout of the smart card type data and subsequently the AT_OATR will not power up or down the SIM, so that any ongoing telecommunication is not hampered. Once a valid ATR_structure is returned, AT+CSIM/APDU commands are to be sent.

Assuming that the telecommunications card MT is inserted, powered and SIM card is present, sending the AT_OATR command will return the ATR_structure information in the same way as it was sent through the SIM task on reset/start-up, but no reset/start-up occurs since the information is read from the buffer.

The AT_OATR is implemented using the following bidirectional signals between TA and ME: each time an APEX_SIM_ATR_INFO_REQ/ALSI_SIM_ATR_INFO_REQ is received, the ATR_structure is returned in the confirmation signals APEX_SIM_ATR_INFO_CNF/ALSI_SIM_ATR_INFO_CNF.

If the SIM card is in a state other than the "SIM ready" state AT_OATR will return CME ERROR (paragraph 9.2 of TS 27.007 spec). That way the host device TE will know if the SIM is not present; busy or whatever reason why the TE could not access the SIM at that moment.

The ATR_structure holds state information and the capabilities about the Smart card reader. The last member of this ATR_structure stores the capabilities of the SIM card, the ATR value. To sum up, the ATR_structure comprises the following members:

CurrentState: contains the status of the card:

| Status | Meaning |
|---|---|
| SCARD_UNKNOWN | The Smart card reader does not know the status. |
| SCARD_ABSENT | No card is currently inserted. |
| SCARD_PRESENT | A card is inserted. |

ClkFrequency: contains the standard clock frequency that the Smart card reader runs at, in KHz, encoded in little-endian format. For example, 3.58 MHz would be encoded as 3580.

BaudRatefactors: contains a byte that codes in binary the unsigned positive integers FI and DI. FI is the reference to a clock rate conversion factor over the bits b8 to b5. DI is the reference to a baud rate adjustment factor over the bits b4 to ME. FI and DI are referencing respectively the factors F and D. Both factors will define the standard baud rate of the Smart card reader. The baud rate period of the transmission clock of the data bit between the smart card and the physical interface device is called the Elementary Time Unit. From the system clock provided to the smart card the ETU is defined by both the Clock Rate Conversion Factor F and the Bit Rate Adjustment Factor D, as follows:

$$1\ etu = \frac{F}{D} \times \frac{1}{f}$$

The possible (F/D) pair values are defined in the ISO7816-3 standard.

PowerMgmtSupport: A flag with a value of zero indicates that the reader does not support clock stop mode. Either a zero indicating that the clock will stop at a level of zero Volts, or a one indicating the clock will stop at the highest voltage level should follow the flag value of 1.

VoltagesSupportedList: contains a list of voltages, in Volt, supported by the Smart card reader physically embedded in the ME Baseband.

ATR: the answer to reset (ATR) information, which the smart card provides to the reader after a warm or cold reset, consists of the initial character TS followed by at most 32 characters. See the relevant ISO/IEC7816-3 and the 3GPP TS 11.11 Rel '98 specifications. Response to the command passed on by the SIM to the ME in the format as described in GSM 11.11 [28] (hexadecimal character format; refer AT+CSCS). When ATR is not available response will be with a CME ERROR specified in paragraph 9.2 of TS 27.007.

A second measure is that the command interpreter TA takes the initiative for getting a response from the addressed memory location on the smart card. The problem which is solved here is that most AT+CSIM commands need to be executed in two phases of access to the SIM. Practically it means that after receiving an +CSIM/APDU command the TA is firing off immediately behind a second one: an APDU with INS code C0 or a 'GET RESPONSE', without waiting for the actual AT+CSIM/'GET RESPONSE' command, which is a lot slower. The TA keeps the answer from the SIM in a buffer until the TE's AT+CSIM/'GET RESPONSE' comes around and is captured by the TA. The TA then gives the content of the buffer as reply and clears it afterwards. If a different APDU passes by from an APDU/'GET RESPONSE' the buffer is cleared anyway.

Another problem is that the smart card reader performs also other tasks than those which it receives from the TA, for example telecommunication tasks, which could involve a change of its address pointer between the receipt of the APDU and the 'GET RESPONSE'. In order to ensure that the 'GET RESPONSE' which is fired off by the TA immediately behind the actual APDU takes the correct response, the smart card reader check its address pointer and corrects it if necessary, before reading the response and returning it to the TA.

The procedure is in fact as follows. The TE sends an APDU wrapped in the AT+CSIM command to the TA, which forwards the APDU to the SIM reader. The APDU in fact comprises an intended address of a memory location on the SIM, from which a response is to be got. The SIM reader sets its address pointer to the supplied intended address, which ripples back to the TA and is stored in the third buffer. The TA then takes initiative and sends a 'GET RESPONSE' to the SIM reader, along with the intended address stored in the third buffer. The SIM reader checks its address pointer by means of the value supplied from the third buffer, i.e. the intended address, and corrects if necessary, and then gets the response from the SIM at the intended address. Finally the response is returned to the TA, where it is stored in the first buffer until the AT+CSIM/'GET RESPONSE' from the application running on the host device comes round.

A third measure is a modification in the AT+CPIN command on the modem ME, which is used for questioning the status of the SIM's user personal codes PIN & PUK. The smart card comprises one or more registers CHVx for storing the PIN & PUK codes or a status thereof. Normally, the modem ME—when performing a personal code request command like AT+CPIN or AT+CPIN?—would refer to a copy of the CHVx registers which is created on power-up of the smart card and kept on the smart card reader. With the method of the invention, it is preferred that the modem ME always refers to the CHVx registers, since there is a possibility that their contents have been changed by an application running on the host device TE and that the copy kept on the smart card reader no longer corresponds to the actual values.

The host applications preferably use the access command AT+CSIM with attached APDU command for evaluating or accessing the CHVx registers on the smart card, instead of AT+CPIN or AT+CPIN? (AT+CPIN is a command to ask for the status of the PIN (AT+CPIN?) plus to enter the PIN code (AT+CPIN=0000)). The reason for letting the host applications use AT+CSIM/APDU is that AT+CPIN or AT+CPIN? by de facto standard would initiate the protocol stack PS, while interference with any telecommunication tasks is to be avoided.

Figure 2:
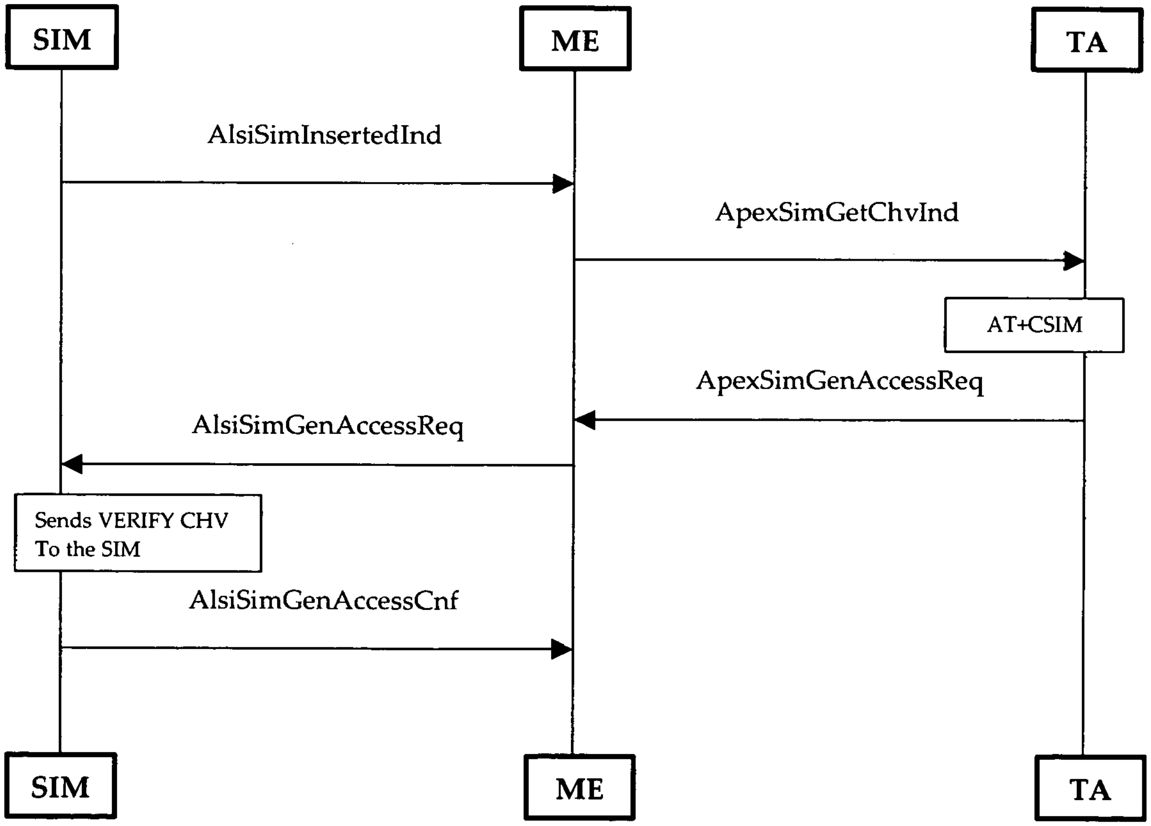
FIG. 2 shows how an access command AT+CSIM is used, according to the invention, by an application on the: host device for verifying personal code information from the smart card.
Figure 3:
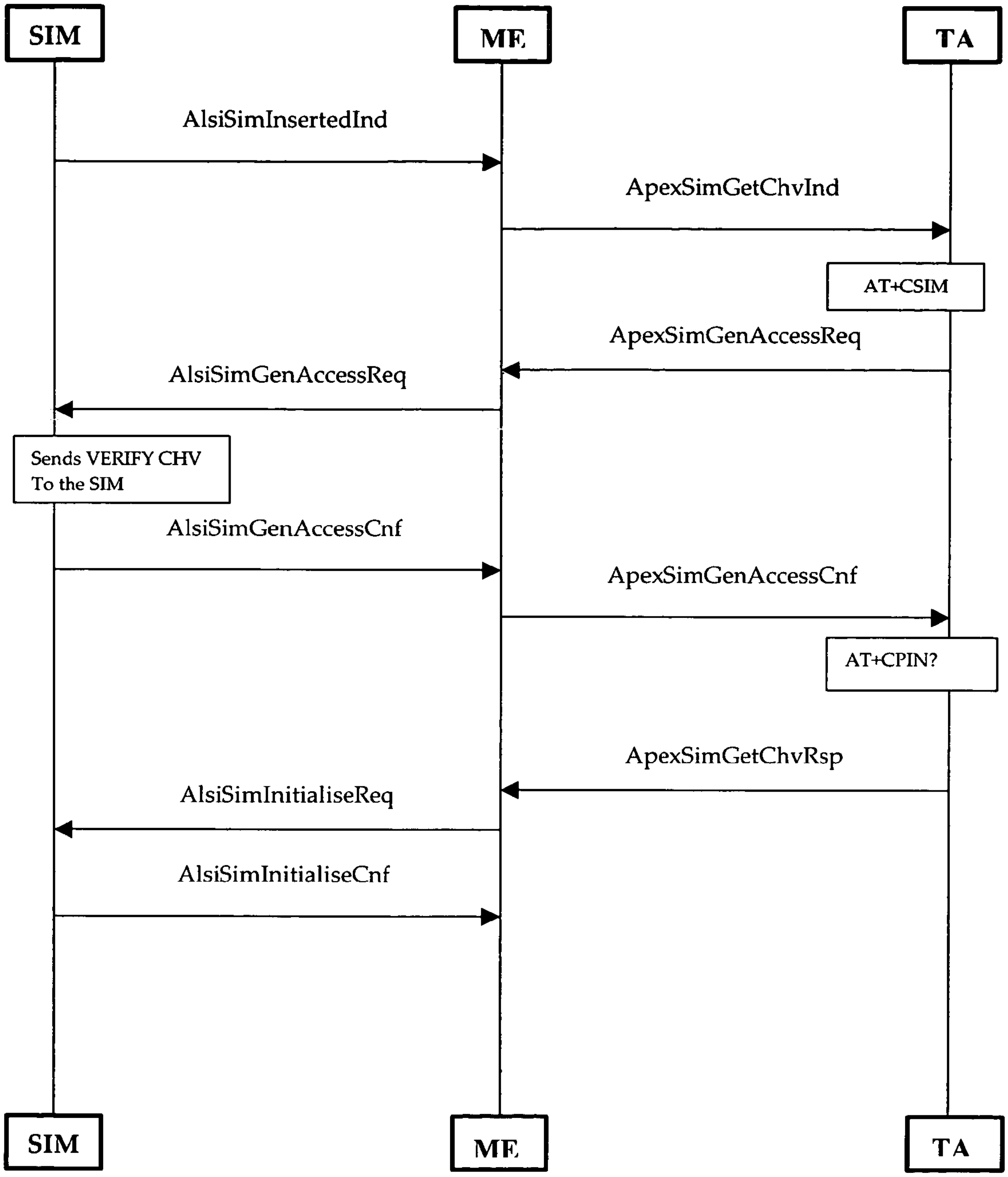
FIG. 3 shows how a personal code request command AT+CPIN/AT+CPIN? is used according to the invention by the modem for verifying personal code information from the smart card.

These measures are further clarified in FIG. 2 and FIG. 3. FIG. 2 shows how use is made of the AT+CSIM/APDU command for accessing the CHVx registers. Once the SIM is inserted, the Smart card reader sends an AlsiSimInsertedInd to the ME. The AlsiSimInsertedInd states the status of the PIN. (i.e. whether it is enabled/disabled/blocked and the number of remaining retries . . . ). The ME then sends an ApexSimGetChvInd to all the registered tasks to request the user(TE) to enter the PIN. At this stage, the ME is waiting for the ApexSimGetChvRsp to come back in order to carry on the initialisation of the ME. With the method of the invention, the requirement is dropped in TA to have first entered the PIN code before any other AT command might be launched. As a result, any AT command can be sent before 'AT+CPIN?' (or 'AT+CPIN=xxxx') and so the PIN code can be entered wrapped in an AT+CSIM command.

FIG. 2 shows that the ME sends an ApexSimGetChvInd to the registered tasks. Given the ApexSimGetChvRsp never comes back, the ME does not send any AlsiSimInitialiseReq to the Smart card reader, and the ME initialisation PS stops there.

On the other hand, FIG. 3 shows how 'AT+CPIN?' command is modified to force the ME initialisation PS after the registers CHVx (PIN) are verified and OK, which meets the network operators' request that the terminal should not register to the network before the PIN code is entered in good order.

In any case 'AT+CPIN?' command always returns the actual status of the PIN, even if the PIN is verified using AT+CSIM command. If for instance the PUK entry code is required effectively the 'AT+CPIN?' should notify so. This is achieved by forcing TA to effectively request the status from the SIM itself instead of relying on the copied value stored in TA. An alternative solution would be to send an indication to TA each time the status of the PIN changes.

In the case of the user(TE) entering the PIN with 'AT+CPIN', an ApexSimGetChvRsp is sent, conveying the CHV value. Once the ME receives the ApexSimGetChvRsp, the ME then sends the AlsiSimIntialiseReq to the Smart card reader. The Smart card reader passes the CHV1 value to the SIM (VERIFY CHV command is sent to the SIM). Once the PIN has been verified, the AlsiSImInitialiseCnf comes back, and the ME carries on starting the protocol stack PS. At least entering the PIN with 'AT+CPIN' will initiate a probing first for the actual status of the PIN as if it were an 'AT+CPIN?' was requested.

In summary, in the method of the invention, the AT+CPIN/AT+CPIN? is reserved for modem tasks, while applications on the host device need to use AT+CSIM/APDU for accessing the PIN/PUK codes on the SIM. Not only does this have the advantage of preventing that an application on the host device would interfere in telecommunication tasks performed by the protocol stack, but also that prior art applications intended for running on the modem do not need to be modified.

The invention claimed is:

1. A method for accessing a smart card (SIM) from a host device (TE), the smart card being connected to the host device (TE) via a telecommunications card (MT) which enables telecommunication between the host device (TE) and a telecommunications network which requires a smart card (SIM) for user identification, the telecommunications card (MT) comprising a command interpreter (TA) for interpreting host device commands and a modem (ME) with associated smart card reader for enabling said telecommunication and user identification, the modem (ME) being only accessible to the host device via the command interpreter (TA), characterised in that the method comprises the steps of:

(a) providing an access command (AT+CSIM) on the host device, said access command instructing the command interpreter (TA) to pass on any attached command originating from the host device (TE) to the smart card reader, (b) attaching an application command (APDU) to said access command (AT+CSIM) and forwarding both to the command interpreter (TA), (c) performing said application command (APDU) on the smart card reader, (d) storing a response given by the smart card (SIM) to said application command in a first buffer which is accessible towards the host device (TE).

2. A method according to claim 1, characterised in that the method further comprises the step of:

(a) including said access command (AT+CSIM) in a driver provided on the host device which is available to any application running on the host device (TE), so that any such application can attach application commands to said access command (AT+CSIM).

3. A method according to claim 2, characterised in that the method further comprises the steps of:

(a) storing smart card type data in a second buffer accessible towards the host device (TE), (b) including a type request command (AT+OATR) in said driver enabling readout of said smart card type data from the second buffer.

4. A method according to claim 1, characterised in that the smart card reader maintains an address pointer, that the command interpreter (TA) comprises a third buffer for storing an address and that said application command (APDU) comprises an intended address of a memory location on the smart card, the intended address being stored in the third buffer upon receipt of the application command (APDU) by the command interpreter (TA) in step (b); step (c) comprising setting the address pointer of the smart card reader to the intended address, and subsequently on initiative of the command interpreter getting a response from the smart card at the intended address stored in the third buffer; the smart card reader comparing the intended address to the address pointer and correcting the latter if necessary before sending the response to the command interpreter in step (d).

5. A method according to claim 1, characterised in that the smart card comprises one or more registers for storing one or more user personal codes (PIN/PUK) or a status thereof, and that the modem (ME)—when performing a personal code request command (AT+CPIN/AT+CPIN?)—always refers to said one or more smart card registers and not to any modem registers which store a copy of said one or more smart card registers.

6. A method according to claim 1, characterised in that the smart card comprises one or more registers for storing one or more user personal codes (PIN/PUK) or a status thereof, and that for evaluating said one or more registers on the smart card from the host device use is made of an access command (AT+CSIM) with attached application command (APDU), in order to avoid interfering with telecommunication tasks performed by the protocol stack.

7. An algorithm for accessing a smart card (SIM) from a host device (TE), the smart card being connected to the host device (TE) via a telecommunications card (MT) which enables telecommunication between the host device (TE) and a telecommunications network which requires a smart card (SIM) for user identification, the telecommunications card (MT) comprising a command interpreter (TA) for interpreting host device commands and a modem (ME) with associated smart card reader for enabling said telecommunication and user identification, the modem (ME) being only accessible to the host device via the command interpreter (TA), characterised in that an access command (AT+CSIM) is provided on the host device, said access command instructing the command interpreter (TA) to pass on any attached command originating from the host device (TE) to the smart card reader, and that the algorithm comprises the steps of:

(a) taking said access command (AT+CSIM), attaching an application command (APDU) to said access command (AT+CSIM) and forwarding both to the command interpreter (TA), (b) performing said application command (APDU) on the smart card reader, (c) storing a response given by the smart card (SIM) to said application command in a first buffer which is accessible towards the host device (TE), (d) reading out said response from the first buffer.

8. An algorithm according to claim 7, characterised in that the algorithm comprises the initial step of reading out smart card type data from a second buffer accessible towards the host device (TE) by means of a type request command (AT+OATR).

9. An algorithm according to claim 7, characterised in that the smart card reader maintains an address pointer, that the command interpreter (TA) comprises a third buffer for storing an address and that said application command (APDU) comprises an intended address of a memory location on the smart card, the intended address being stored in the third buffer upon receipt of the application command (APDU) by the command interpreter (TA) in step (h); step (i) comprising setting the address pointer of the smart card reader to the intended address, and subsequently on initiative of the command interpreter getting a response from the smart card at the intended address stored in the third buffer; the smart card reader comparing the intended address to the address pointer and correcting the latter if necessary before sending the response to the command interpreter in step (j).

* * * * *

UNITED STATES PATENT AND TRADEMARK OFFICE

CERTIFICATE OF CORRECTION

PATENT NO. : 7,137,565 B2
APPLICATION NO. : 10/961399
DATED : November 21, 2006
INVENTOR(S) : Van Overbeke et al.

It is certified that error appears in the above-identified patent and that said Letters Patent is hereby corrected as shown below:

On the title page, item 54 and in column 1, line 5, after the word "TELECOMMUNICATIONS" insert the word --CARD--.

Signed and Sealed this

Third Day of April, 2007

JON W. DUDAS

*Director of the United States Patent and Trademark Office*